G. R. AMON.
TREE BRACING DEVICE.
APPLICATION FILED APR. 1, 1920.
1,367,906. Patented Feb. 8, 1921.
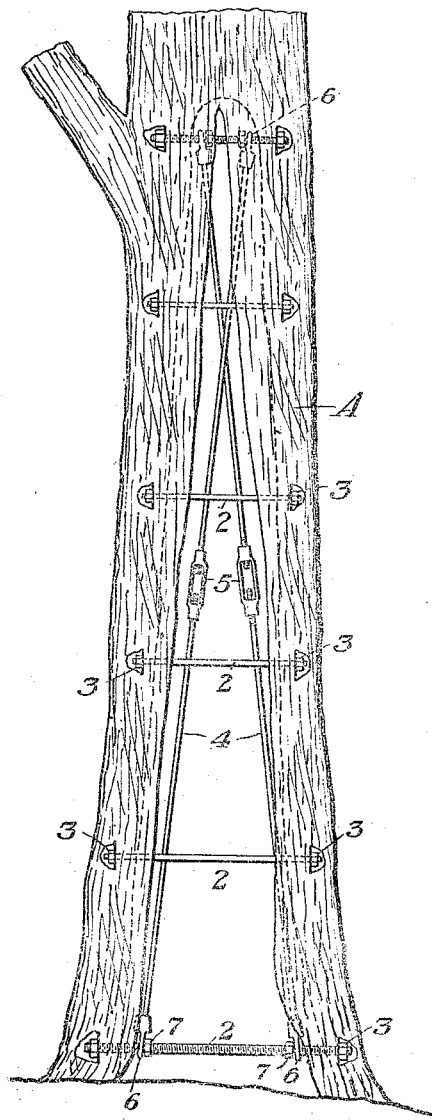
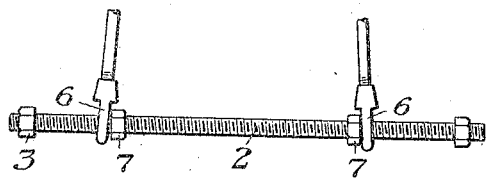
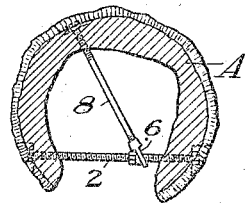
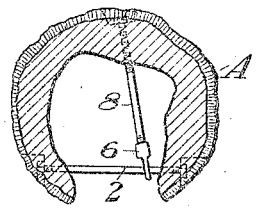
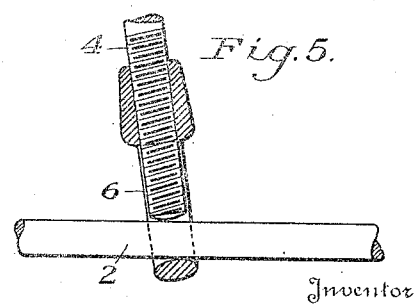
Inventor
Glenn R. Amon

UNITED STATES PATENT OFFICE.

GLENN R. AMON, OF HELENA, OHIO, ASSIGNOR TO THE DAVEY TREE EXPERT COMPANY, OF KENT, OHIO, A CORPORATION OF OHIO.

TREE-BRACING DEVICE.

1,367,906.     Specification of Letters Patent.     Patented Feb. 8, 1921.

Application filed April 1, 1920. Serial No. 370,433.

*To all whom it may concern:*

Be it known that I, GLENN R. AMON, residing at Helena, in the county of Sandusky and State of Ohio, have invented a new and useful Improvement in Tree-Bracing Devices, of which the following is a full, clear, and exact description, reference being had to the accompanying drawings, forming part of this specification, in which—

Figure 1 is a front elevation showing one form of tree cavity bracing arranged in accordance with my invention and prior to filling;

Fig. 2 is an enlarged view of the lower bolt;

Figs. 3 and 4 are cross sectional views showing another arrangement; and

Fig. 5 is an enlarged detail view of the form of Fig. 4.

My invention relates to the bracing rods or bolts employed in connection with filling tree cavities, and is designed to provide a simple, cheap and effective connection which may be easily applied in place, without the need for any blacksmithing at the job.

In the drawing, I show the trunk A of a tree having a large cavity therein extending upwardly from the ground level. The side walls of the cavity are preferably interbraced and connected by means of cross bolts 2, extending through holes bored at the sides of the cavity and provided with nuts 3, at their ends. These bolts may be threaded at one or both ends or throughout, as desired. 4 represents longitudinal bracing members, shown as composed of rods connected by turn-buckles 5, for drawing them tight, the ends of these longitudinal rods being connected to the cross braces or bolts.

This connection forms the main subject matter of my invention, and for this purpose, I use an eye 6, having a threaded hole in its socket member, this eye being threaded on the cross bolt and the longitudinal rod 4 having the threaded end screwed into the screw-threaded socket of the eye. The eye may be held in place on the cross bolt by one or more lock nuts 7, as shown in Figs. 1 to 3, or by screwing the threaded end of the longitudinal rod into engagement with the cross bar 2, as shown in Figs. 4 and 5.

In Figs. 3 and 4, I show additional transverse braces 8, extending from the back side of the tree through port holes, and engaging the cross bolt or cross rod 2; the same eyes being used for the connection as in the case of longitudinal eyes.

The advantages of my invention result from the use of the eyes, which may be threaded on one member and engaged by the threaded end of another member in applying the bracing. The eyes may be forged or cast, or otherwise formed, and give a simple, efficient and easily applied connection for the different parts of the bracing system.

I claim:

1. As an article of manufacture for concrete reinforcement in tree surgery, a brace having a body portion adapted to be embedded within the concrete, said brace having at least one end screw-threaded, an eye on one end of said brace having a rotatable connection therewith and adapted to coöperate with another bracing member, and means on the other end of said brace for exerting tension thereon while said eye is in coöperative engagement with such other bracing member, substantially as described.

2. A tree bracing device for use in concrete reinforcing of trees, comprising a member adapted to brace the tree in one direction, and a second member adapted to coöperate therewith for bracing the tree in another direction, said second member having an adjustable eye through which said first member passes, substantially as described.

3. As an article of manufacture for concrete reinforcement in tree surgery, a brace having a body portion adapted to be embedded within the concrete, said brace having its opposite ends screw-threaded, an adjustable eye on one of said threaded ends adapted to coöperate with another bracing member, said bracing member, and means on said other threaded end for exerting tension on the brace while said eye is in coöperative engagement with said bracing member, substantially as described.

4. As an article of manufacture for concrete reinforcement in tree surgery, a brace having a body portion and having its opposite ends screw-threaded, an adjustable eye on one of said threaded ends adapted to coöperate with another bracing member, said bracing member, means on said other threaded end for exerting tension on the brace while said eye is in coöperative engagement with said bracing member, and means on said bracing member for positioning the eye thereon, substantially as described.

5. A tree bracing device for use in concrete reinforcing of trees, comprising a member adapted to brace the tree in one direction, a second member adapted to coöperate therewith for bracing the tree in another direction, said second member having a detachable eye through which said first member passes, and means on said first member for positioning said eye thereon, substantially as described.

6. A tree bracing device for use in concrete reinforcing of trees, comprising a member adapted to brace the tree in one direction, a second member adapted to coöperate therewith for bracing the tree in another direction, said second member having a detachable eye through which said first member passes, and a screw threaded connection between said second member and said eye, said eye having a screw threaded opening entirely therethrough whereby the second member may be moved to clamp the first member in position in the eye, substantially as described.

7. A tree bracing device for use in concrete reinforcing of trees, comprising a member adapted to brace the tree in one direction, a second member adapted to coöperate therewith for bracing the tree in another direction, said second member having a detachable eye through which said first member passes, a screw threaded connection between said second member and said eye, said eye having a screw threaded opening entirely therethrough whereby the second member may be moved to clamp the first member in position in the eye, and means for exerting tension on said second member after said first member is clamped in position in said eye, substantially as described.

8. A tree brace, comprising a bracing member extending in one direction within the tree, a second bracing member extending in another direction within the tree, a detachable eye carried by said second bracing member and through which said first bracing member extends, and means for maintaining the proper relation between said eye and said first bracing member, substantially as described.

9. As an article of manufacture, a brace for use in tree surgery comprising a body portion, an eye rotatably connected to one end of said body portion and adapted to coöperate with a second bracing member, and means on the other end of said body portion for exerting tension on the brace while said eye is in coöperative engagement with such other bracing member, substantially as described.

In testimony whereof, I have hereunto set my hand.

GLENN R. AMON.